(12) United States Patent
Schmitt et al.

(10) Patent No.: US 9,435,994 B2
(45) Date of Patent: Sep. 6, 2016

(54) ACCESSORY ADAPTER FOR SIMPLIFIED TARGET ACQUISITION

(71) Applicant: Carl Zeiss Sports Optics GmbH, Wetzlar (DE)

(72) Inventors: Christoph Schmitt, Biebertal (DE); Gerold Dobler, Bad Boll (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 37 days.

(21) Appl. No.: 14/095,733

(22) Filed: Dec. 3, 2013

(65) Prior Publication Data

US 2014/0153119 A1 Jun. 5, 2014

Related U.S. Application Data

(60) Provisional application No. 61/732,435, filed on Dec. 3, 2012.

(30) Foreign Application Priority Data

Dec. 3, 2012 (DE) .................. 10 2012 111 730

(51) Int. Cl.
*G02B 7/02* (2006.01)
*G02B 23/16* (2006.01)
*G02B 23/14* (2006.01)
*F41G 11/00* (2006.01)

(52) U.S. Cl.
CPC .............. *G02B 23/16* (2013.01); *F41G 11/003* (2013.01); *G02B 23/14* (2013.01)

(58) Field of Classification Search
CPC ..................................................... G02B 7/026

USPC ................................................. 359/818, 819
See application file for complete search history.

(56) References Cited

U.S. PATENT DOCUMENTS

| | | | |
|---|---|---|---|
| 2,510,289 A | 6/1950 | Livermore | |
| 2,528,080 A | 10/1950 | Robertson | |
| 3,873,823 A * | 3/1975 | Northrup | G02B 23/16 33/286 |
| 5,166,823 A | 11/1992 | Feinbloom et al. | |
| 5,526,194 A * | 6/1996 | Ruffell | G03B 11/00 359/811 |
| 2002/0114070 A1 | 8/2002 | Barziza | |
| 2005/0078956 A1 | 4/2005 | Pernstich et al. | |
| 2008/0212175 A1 | 9/2008 | Agnetti | |

FOREIGN PATENT DOCUMENTS

DE 20 2008 010 323 U1 12/2009
WO WO 97/29343 A1 8/1997

OTHER PUBLICATIONS

Partial English translation and Office action of the German Patent Office dated Aug. 26, 2013 in German patent application 10 2012 111 730.6 on which the claim of priority is based.
"Celestron SkyScout Scope 90 Instruction Manual", Jan. 1, 2007, Celestron, Torrance, CA XP055102106, pp. 1 to 16.

* cited by examiner

*Primary Examiner* — James Jones
(74) *Attorney, Agent, or Firm* — Walter Ottesen, P.A.

(57) ABSTRACT

An accessory adapter is for simplified target acquisition and can be used on or with an imaging optical device, in particular a magnifying imaging optical device. The accessory adapter enables the optical device to be equipped with other high-precision sighting devices for simplified target acquisition.

13 Claims, 5 Drawing Sheets

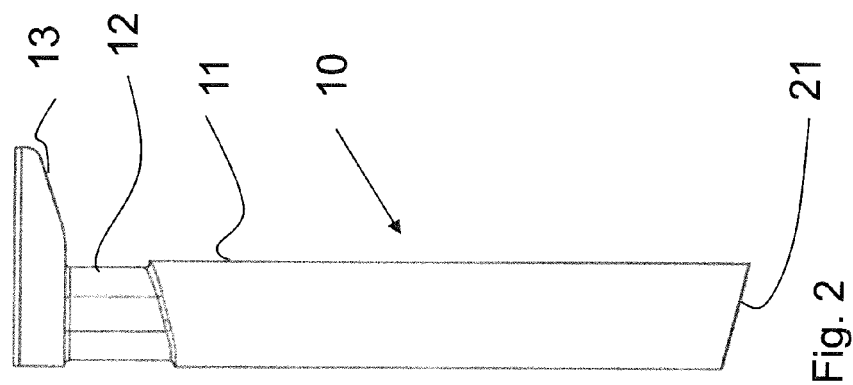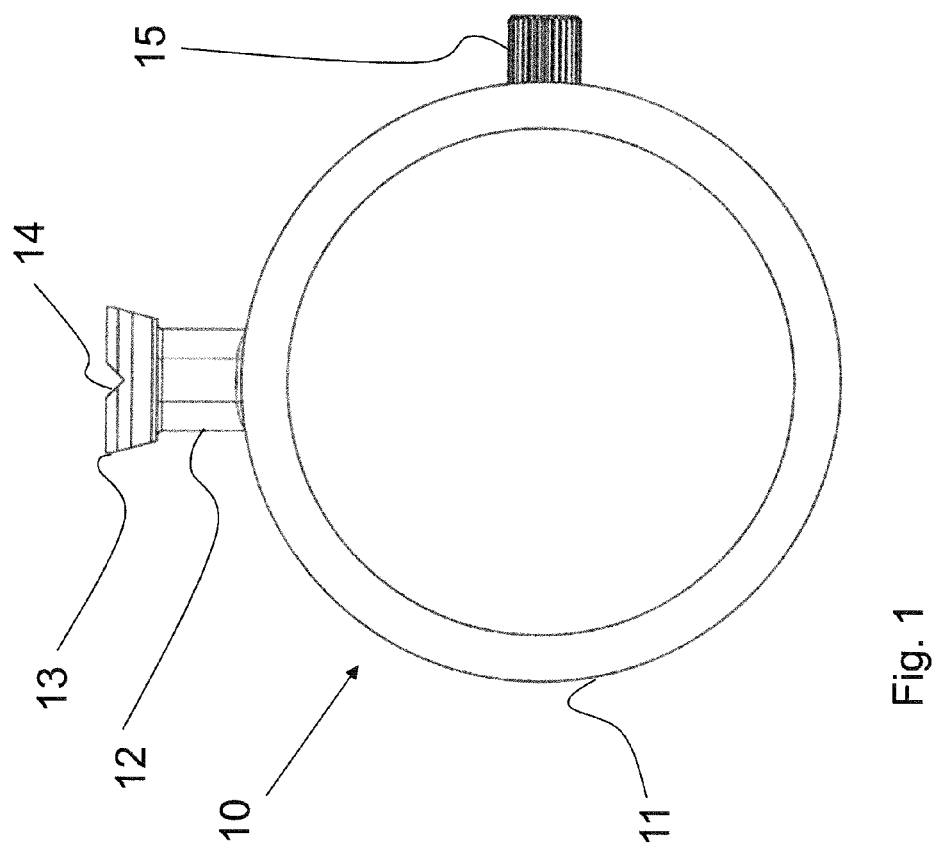

ACCESSORY ADAPTER FOR SIMPLIFIED TARGET ACQUISITION

CROSS REFERENCE TO RELATED APPLICATIONS

This application claims priority of German patent application no. 10 2012 111 730.6 and U.S. Provisional Application No. 61/732,435, both filed Dec. 3, 2012, and the entire content of both applications is incorporated herein by reference.

FIELD OF THE INVENTION

The present invention relates to an accessory adapter for simplified target acquisition, which can be used on or with an imaging optical device, in particular a magnifying imaging optical device. The accessory adapter moreover permits to equip the optical device with further high-precision sighting devices for simplified target acquisition.

BACKGROUND OF THE INVENTION

Imaging optical devices, in particular magnifying imaging optical devices, such as a spotting scope, a telescope, or a telephoto lens, can often be attached to a tripod. This has the advantage that a user, for example when observing an object in open terrain for a certain longer period of time, need not hold the weight of the optical device for this longer period. In addition, supporting of an imaging optical device using a tripod often has the advantage that a specific orientation and position of the optical device may be fixed and so a long-term observation of a specific area or object can be greatly simplified.

Various mounting members for supporting have been developed. For example, DE 20 2008 010 323 U1 describes a mounting means for an optical device. The mounting means permits to connect a telescope to a base object, in particular to a tripod head. The mounting means allows for a rectilinear movement of the optical device within an adjustment range, and a limit of movement may be set for the adjustment range.

United States patent application publication 2008/0212175 also discloses a supporting and adjusting means for an optical observation system, wherein the optical device is connectable with a tripod and can be mounted pivotably.

If very distant objects are to be found using high magnification imaging optical devices, it is often difficult to find the object rapidly. This may be the case, for example, when a small object is to be found quickly at a greater distance using a high magnification telephoto lens of a camera. Equally difficult it can be to quickly find an object that is in motion when using a spotting scope, for example. It may be particularly difficult to locate the object or to find the target if no auxiliary device for sighting is provided, such as an additional or auxiliary sight.

SUMMARY OF THE INVENTION

It is an object of the invention to provide a way to improve and to considerably simplify target acquisition for a user when using an imaging optical device, in particular a magnifying imaging optical device.

It should moreover be enabled to releasably connect other devices to the optical device, easily and securely, in particular devices assisting in target acquisition.

Transporting options and robustness of the optical device should not be significantly affected thereby.

This object is achieved in a surprisingly simple way by an accessory adapter for simplified target acquisition for use on or with an imaging optical device, which already includes a simple auxiliary sight and which is adapted to combine an auxiliary device, such as a high precision sighting device, with the imaging optical device.

Accordingly, the invention relates to an accessory adapter for simplified target acquisition for use on or with an imaging optical device, in particular a spotting scope. The accessory adapter includes a profiled rail; a bar; and, a circular ring-shaped fastening element for connecting a first end of the bar with the optical device. The end of the bar opposite to the first end is connected to the profiled rail.

The profiled rail may already be used as a simple auxiliary sight, or for accommodating an auxiliary device. The auxiliary device may preferably include accurate or high-precision devices for target acquisition, that is, for sighting or focusing on an object. In case of an imaging optical device with magnification or high-magnification properties, the acquisition of an object may significantly be simplified thereby, even at a larger distance from the optical device, because a user will not sight through the objective lens of the optical device, but will be able to find the object much easier using the auxiliary sight or auxiliary device. Besides a spotting scope, the optical device may include other imaging optical devices, in particular magnifying imaging optical devices, such as a telescope, or a telephoto lens.

The profiled rail is connected, via a bar, with a circular ring-shaped mounting element which can be connected to the optical device. Advantageously, the profiled rail may be formed as a rectilinear, elongated profiled member and may be arranged so that its longitudinal axis extends in parallel to the optical axis of the optical device.

The profiled rail may have a groove running centrally along the longitudinal axis thereof in the surface facing away from the optical device. Most advantageously, this groove is formed as a U-shaped or V shaped groove. Such rails can be manufactured at low cost and with high precision.

In this way, when used on or with an imaging optical device, the groove may be used as a rear sight for simplified target acquisition. Accordingly, the profiled rail of the accessory adapter may most beneficially be used as an auxiliary sight for aiming at an object.

In order to enable rapid target acquisition, the groove is suitably provided in a sufficient length to allow for appropriate guidance of the eye of a user along the groove and to facilitate target acquisition. A line of sight defined in this way may then already provide for guidance of the eye with a sufficiently high precision. Particularly suitably, therefore, the groove has a length of at least 20 mm, more preferably at least 25 mm, and most preferably at least 30 mm.

Furthermore advantageously for the purposes of the invention, the profiled rail is formed with a profile for receiving the auxiliary device. Particularly suitably, the profile may be a dovetail profile. However, it is also possible to provide rails with other cross-sectional shapes or other profiles, for example so-called Picatinny rails, Weaver or 11 mm prism rails which may be used to mount reflective sights. Preferably, the shape of the profile of the profiled rail is determined by the type of auxiliary device to be connected to the optical device.

In one embodiment of the invention, the profiled rail is attached to the bar in a manner so as to be replaceable, so that by replacing the profiled rail a user may easily attach an alternative profile to the optical device, for receiving the auxiliary device.

The invention further relates to a circular ring-shaped fastening element for firmly and releasably connecting the bar with the optical device. Particularly advantageously, the circular ring-shaped fastening element may be attached to a circular portion or section of the optical device. Often, imaging optical devices comprise an objective lens which includes optical components such as lenses or apertures and which is typically of circular shape. Advantageously for the purposes of the invention, therefore, the circular ring-shaped fastening element may be attached to a portion of the outer lateral surface of the objective lens.

Particularly favorably, the circular ring-shaped fastening element is configured so as to be of exactly complementary shape to that of the portion of the outer lateral surface of the objective lens it is to be attached to.

In this case, the corresponding area of the outer lateral surface may be formed with a circumferential recess or groove which allows the fastening element to be received and/or laterally fixed on the lateral surface. When being installed, the fastening element may be slipped onto the appropriate portion.

Particularly preferably, the fastening element is mounted so as to be axially rotatable around the optical axis of the objective lens. This has the advantage that the fastening element may be turned in a simple manner. In this way, the profiled rail fixed via the bar may likewise be rotated axially around the optical axis for being placed in different positions.

This may for example be a position or operational position in which the profiled rail may be used as an auxiliary sight. Also, by rotating the fastening element, the profiled rail may be turned into another, second position in which it will be better protected, for example when the optical device is transported. This position may therefore be referred to as a transport position.

Most preferably, the fastening element is or can be latched in different positions, for example four different positions, in order to facilitate setting of specific predefined positions by the user. A latching mechanism may for example be provided by appropriate recesses in the outer lateral surface of the objective lens in the contact area to the fastening element, and by a spring-biased ball thrust piece at the inner surface of the circular ring-shaped fastening element. Latching may be obtained in different positions, for example after axial rotation for every 45° or 90°.

Additionally, the fastening element may be equipped with a means for fixing in a specific position to enable the user to fix the profiled rail most easily in a specific position by manual fixation of the fastening element. This may be the case, for example, when the optical device is used in a position rotated around the optical axis and the profiled rail is desired to be maintained in a horizontal orientation.

Furthermore advantageously, the fastening element may be provided with a recess or indentation on its outer lateral surface, so that manual rotation thereof by the user is facilitated by an improved handling.

The invention further relates to a bar for connecting the profiled rail with the fastening element. One end of the bar is connected to the fastening element, the opposite end to the profiled rail. This has the advantage that the profiled rail automatically follows the optical axis of the optical device. In order that the groove may already be used as an auxiliary sight, it will be helpful that in an operational position a line of sight formed by the groove does not have any points of intersection with the optical device or parts thereof, so as to not interfere with the view of a user along the groove. Therefore, the bar also serves to provide a sufficient space between the groove of the profiled rail and the optical device in the operational position.

It may be advantageous in this context to alter the distance of the profiled rail to the optical axis of the optical device between the operational position and the transport position, for example to obtain a greater space in the operational position, but to arrange the profiled rail in a protected position as close as possible to the objective lens in the transport position. Often, such imaging optical devices are connectable with a tripod, through a tripod connection. Particularly advantageously in this case, the transport position of the profiled rail may be a position in which the profiled rail is turned into a position in which the profiled rail is rotated so as to form an extension of the tripod connection and is fixed in this position. This allows for a particularly compact accommodation of the profiled rail during transport, which may additionally offer high protection against external influences.

The fastening element, the bar, and/or the profiled rail may be made from materials including plastics or stainless steel, or from light-weight materials, such as aluminum or titanium. Most preferably, a corrosion-resistant material is selected to provide weather resistance.

The accessory adapter of the invention may advantageously be used to facilitate target acquisition when an imaging optical device is used, in particular a spotting scope, a telescope, or a telephoto lens. This is achieved in a particularly easy way by the profiled rail which can be used as an auxiliary sight.

Further, the accessory adapter may also be used to firmly and removably connect an auxiliary device to the imaging optical device, in particular a high-precision device for target acquisition. In this way, the accessory adapter provides for the attachment of additional sighting means, such as a reflex sight or a laser pointer.

The invention therefore furthermore relates to an optical device such as a spotting scope, a telescope, or a telephoto lens, which includes an accessory adapter according to the invention.

BRIEF DESCRIPTION OF THE DRAWINGS

The invention will now be described with reference to the drawings wherein:

FIG. 1 shows a plan view of an accessory adapter;

FIG. 2 shows a side elevational view of an accessory adapter;

DESCRIPTION OF THE PREFERRED EMBODIMENTS OF THE INVENTION

Figure 3:
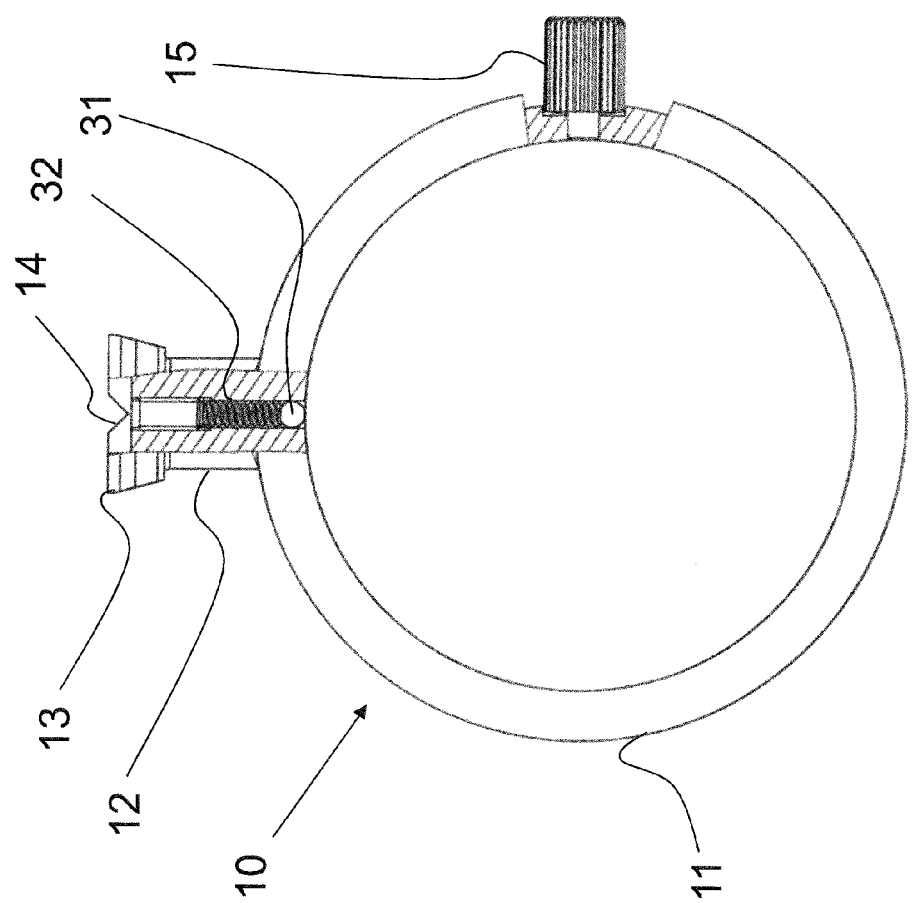
FIG. 3 shows a sectional view of an accessory adapter.

In the following detailed description of preferred embodiments, for the sake of clarity, the same reference numerals denote similar parts in or on these embodiments.

FIG. 1 shows an accessory adapter 10 according to the invention, which comprises a fastening element 11 of circular annular shape. Circular ring-shaped fastening element 11 has an inner diameter selected so that it can be slid, with little clearance, onto an outer portion of the lateral surface of a circular portion of the optical device. In its assembled state, the accessory adapter is mounted on and firmly attached to the optical device. In the assembled state, the center of fastening element 11 is on the optical axis of the objective lens (43 in FIG. 4).

Profiled rail 13 is formed with a dovetail profile, in order to allow for an auxiliary device, in particular a precise or high-precision sight, to be easily mounted. It is also possible for profiled rail 13 to be formed with a different profile shape, including profiles such as known from so-called Picatinny rails, Weaver or 11 mm prism rails. Such profiles are used in firearms, for example, to enable a reflex sight to be connected to the firearm. It is also possible to attach an adapter (not shown) having a profile different from a dovetail profile to the profiled rail 13 with dovetail profile, for example an adapter having a Picatinny profile, to enable to connect auxiliary devices which do not have a dovetail mount with the profiled rail 13 that has a dovetail profile. This permits to simply and securely connect even auxiliary devices or accessory components which have a Picatinny mount, for example, to the profiled rail 13. In this way, a very large flexibility in mounting the auxiliary device can be achieved.

Moreover, profiled rail 13 is formed with a central, longitudinally extending groove 14. This groove 14 extends in parallel to the optical axis. Groove 14 is provided at the side of the profiled rail 13 which faces away from fastening element 11, and is formed as a V-shaped groove.

The lowest point of the groove may define a line of sight when a user looks along this groove. Extension of this line of sight towards the environment then allows to target a point in the terrain. In this way, groove 14 may be used as a rear sight for simplified target acquisition, and therefore constitutes an auxiliary sight.

Apart from a V-shaped groove, other groove shapes are possible, for example U-shaped grooves. In the mounted state, groove 14 extends in parallel to the optical axis. In order to permit to be used as a rear sight for target acquisition, the profiled rail has a predetermined length in the region of the groove. This may be achieved by extension of the profiled rail beyond the length of the fastening element. Particularly suitably, the profiled rail has a length of at least 20 mm, more preferably at least 25 mm, and most preferably at least 30 mm.

Further, a bar 12 is provided, which has a first end thereof connected to the fastening element 11 and an opposite end connected to profiled rail 13. The length of bar 12 permits to define the space between groove 14 and the center of circular ring-shaped fastening element 11, which falls to the optical axis 43 of the objective lens in the assembled state. Bar 12 may be configured to be telescopically extendable, in order to permit to set different spaces from the optical axis 43. Particularly advantageously, a fixing screw may be provided for fixation in a specific position.

FIG. 2 shows a side elevational view of an accessory adapter 10. The outer contour 21 of circular ring-shaped fastening element has a conical shape, in order to allow to be fitted to a likewise conical portion of the objective lens of complementary shape. Other outer contours are possible and may be selected in correspondence with the outer geometry of the objective lens.

FIG. 3 shows a sectional view of an accessory adapter 10. An opening 33 is provided in the inner lateral surface of circular ring-shaped fastening element 11, which opening is adapted to receive a ball thrust piece 31. Ball thrust piece 31 is spring-biased by a force produced by spring element 32. In a relaxed state, ball thrust piece 31 protrudes into the interior of circular ring-shaped fastening element 11 and thus projects from the inner lateral surface 34 of fastening element 11.

In its mounted state, fastening element 11 may be rotated in an axial direction. Ball thrust piece 31 may be latched in appropriate indentations or recesses in the outer surface of the portion of the objective lens to which the accessory adapter is attached. In this way, a mounted accessory adapter may be latched in different positions.

Therefore, particularly suitably, the outer contour of the objective lens in the contact area with accessory adapter 10 is provided with indentations or recesses at predetermined angular intervals, into which the ball thrust piece 31 may engage upon axial rotation of the fastening element. The angular spacing of these indentations may be defined depending on the application, for example with an angular spacing of 45° or 90°, or at positions different therefrom. Spring element 32 may advantageously be accommodated inside bar 12.

Figure 4:
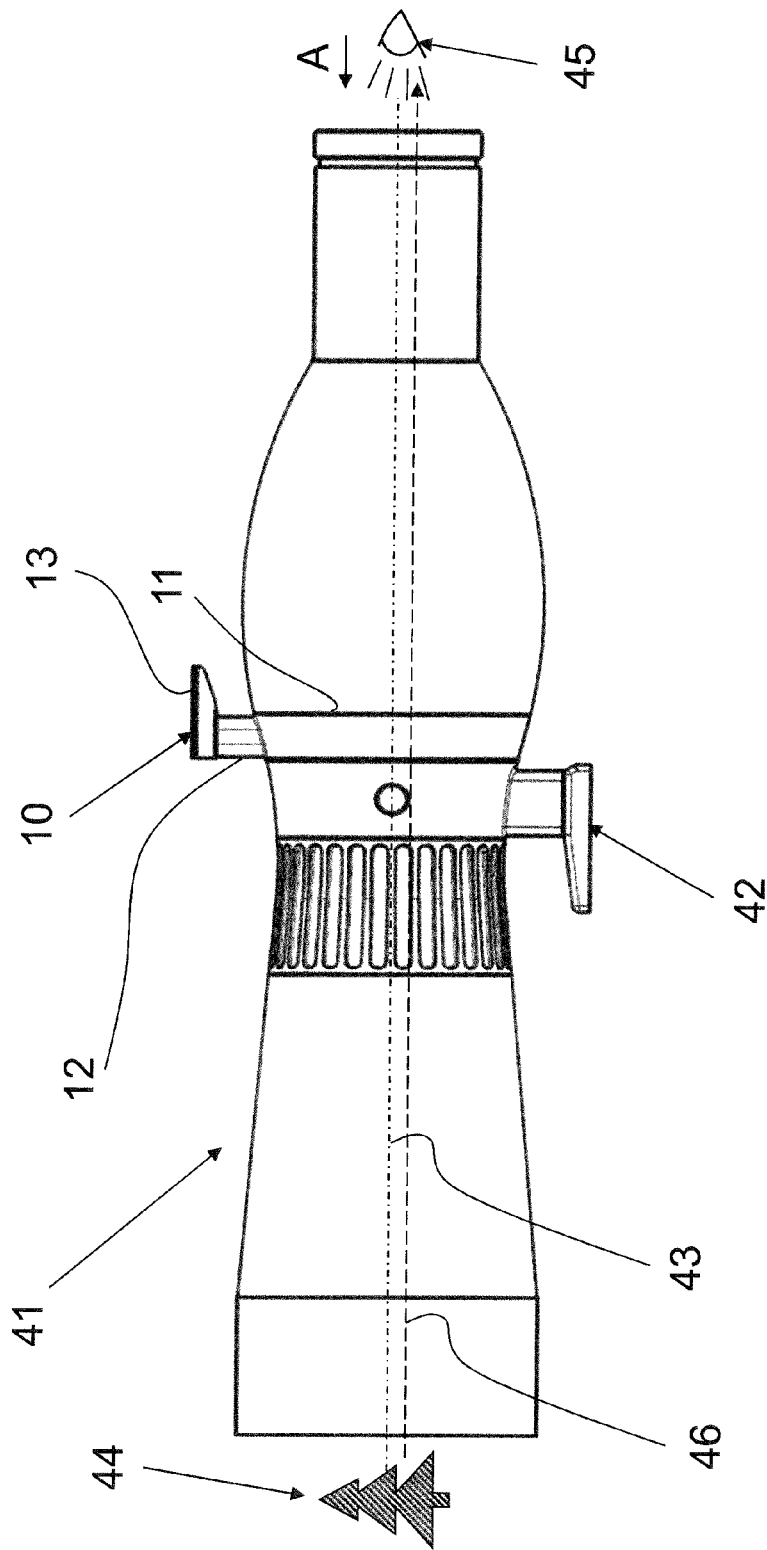
FIG. 4 shows a spotting scope with an accessory adapter turned into an operational position.

Furthermore, fastening element 11 is equipped with a locking wheel 15 to enable the accessory adapter 10 to be fixed manually in different axial positions on the objective lens, for example in a transport position or in a preferred operational position. FIG. 4 illustrates an imaging optical device with an accessory adapter 10. The spotting scope 41 shown comprises a tripod connection 42 and accessory adapter 10. A user 45 may look through the spotting scope 41 along optical axis 43 in a viewing direction A to an object 44. Here, 46 indicates the direction of light, which propagates from the object 44 and the environment towards the eye of user 45.

Both the tripod connection 42 and the accessory adapter 10 are attached at a circular portion of the optical device. In the area of the surface contacting accessory adapter 10, the outer lateral surface of the optical device is provided with a circumferential recess onto which the fastening element 11 may be slid when being mounted. Thereafter, tripod connection 42 may also be slid onto the portion of the optical device. In this manner, accessory adapter 10 is laterally fixed at both side thereof, while being rotatable axially.

The outer contour of fastening element 11 is matched to the outer contour of the portion it is to be attached on. This allows the fastening element to be combined in an ergonomic and geometrically homogeneous manner to the adjacent lateral surface of the circular portion of the optical device.

The fastening element 11 may be rotated axially so that the profiled rail 13 may also be rotated into various positions. FIG. 4 shows the profiled rail in a preferred operational position, in which a user may look along groove 14 and may aim at a target in the extension of the line of sight defined thereby. Target acquisition is facilitated by the fact that the rear sight automatically follows the optical axis 43 of spotting scope 41. In this way, by means of the accessory adapter 10 alone simplified target acquisition is achieved very easily and quickly, in particular with a strongly magnifying imaging optical device such as spotting scope 41.

Figure 5:
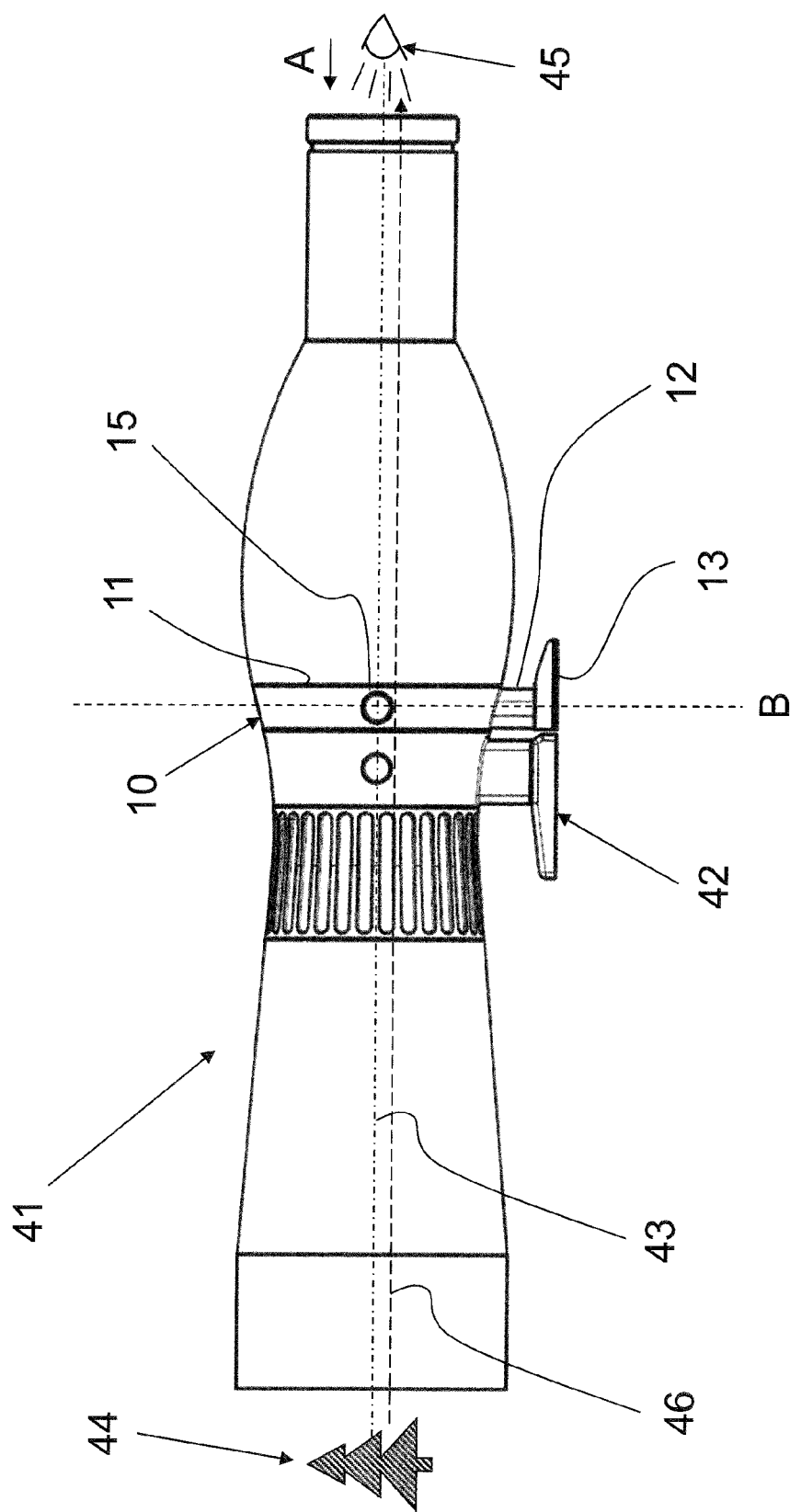
FIG. 5 shows a spotting scope with an accessory adapter turned into a transport position; and, FIG. 6 shows a sectional view through a spotting scope with an accessory adapter.

FIG. 5 illustrates a spotting scope 41 with an accessory adapter 10, where fastening element 11 has been turned into a position in which the profiled rail 13 is in a position in extension of tripod connection 42. This position of profiled rail 13 may also be referred to as a transport position. In this position profiled rail 13 is protected from external influences during a transport of the optical device. Moreover, the installation space such as in a transport means may be reduced.

Figure 6:
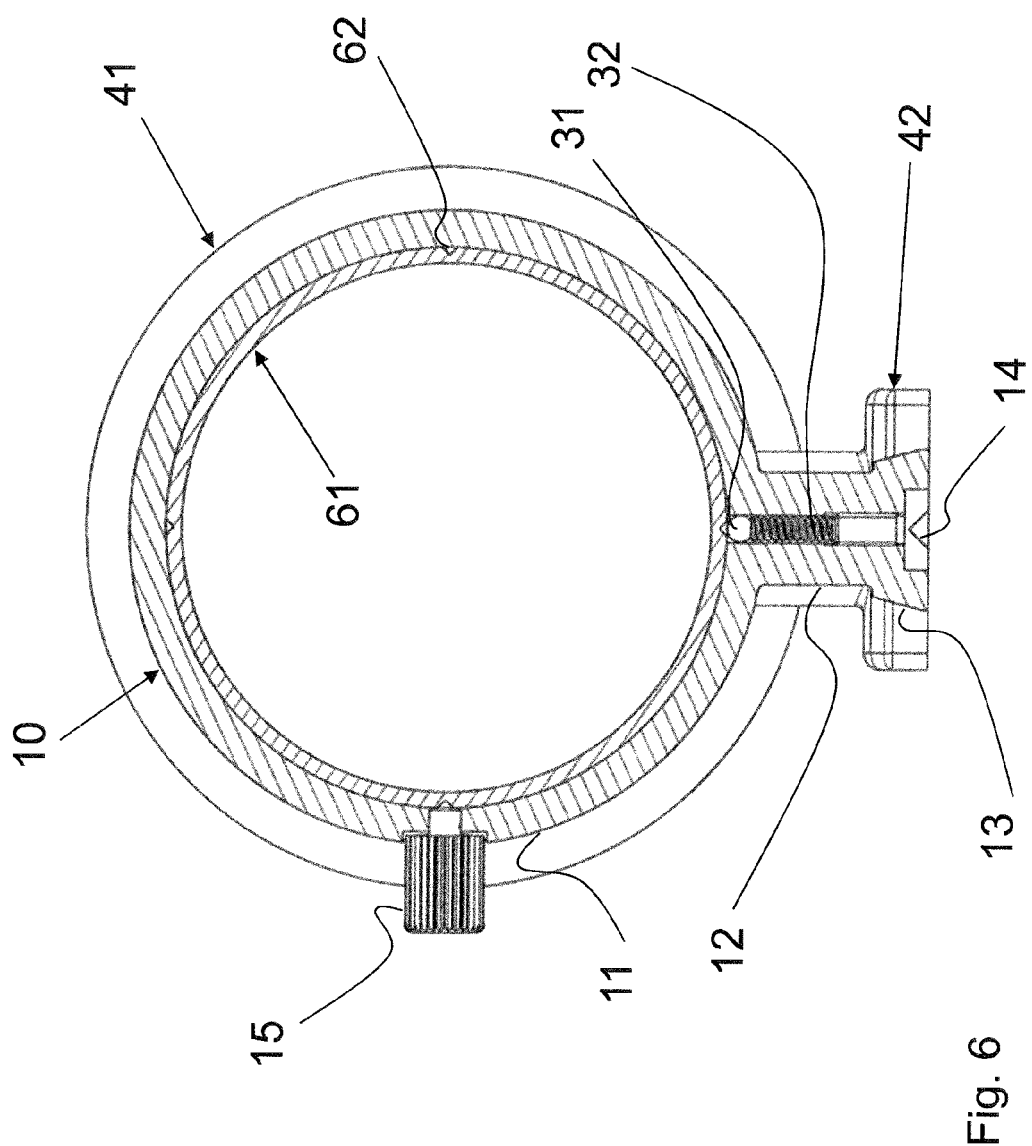

FIG. 6 shows a sectional view through a spotting scope 41 with an accessory adapter 10 mounted thereon. Shown is a view along a sectional axis B through spotting scope 41 with accessory adapter 10 as shown in FIG. 5, in viewing direction A. What is shown in the sectional view is housing 61 of the optical device in an area of that portion which is joined to fastening element 11. In this area, indentations 62 are formed in the circumferential outer lateral surface of housing 61 for engagement of ball thrust piece 31. Four indentations 62 are shown, which are arranged symmetrically around the circumferential contour and thereby allow the fastening element 11 to be latched after a rotation of every 90°. Most advantageously, the indentations are arranged in a manner so that the accessory rail may be latched in preferred positions, for example in the preferred operational position or in a transport position.

It will be apparent to a person skilled in the art that the invention is not limited to the exemplary embodiments described above with reference to the figures, rather it may be varied in many ways without departing from the scope of the subject matter of the patent claims. In particular, the features of individual embodiments may be combined with each other.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Accessory Adapter
11 Circular ring-shaped fastening element
12 Bar
13 Profiled rail
14 Groove
15 Locking wheel
21 Outer contour of fastening element
31 Ball thrust piece
32 Spring element
33 Opening
34 Inner lateral surface
41 Spotting Scope
42 Tripod connection
43 Optical axis
44 Object
45 User
46 Direction of light
61 Housing
62 Indentations

What is claimed is:

1. An accessory adapter for a simplified target acquisition configured for use on or with an imaging optical device, the accessory adapter comprising:
    a profiled rail;
    a bar having a first and a second end;
    a circular ring-shaped fastening element configured to connect said first end of said bar to the optical device;
    said second end of said bar being configured to connect to said profiled rail;
    the optical device defining an optical axis; and,
    said profiled rail defining a longitudinal axis configured to be parallel to said optical axis.

2. The accessory adapter of claim 1, wherein:
    said profiled rail has a first side configured to face away from the optical imaging device and a groove extending centrally along said longitudinal axis on said first side.

3. The accessory adapter of claim 2, wherein:
    said groove defines a line of sight which extends beyond either side of said groove; and,
    said line of sight has no touch points with the optical device or parts thereof.

4. The accessory adapter of claim 1, wherein said profiled rail has a profile configured to receive an auxiliary device.

5. The accessory adapter of claim 4, wherein said profile is one of a dovetail profile, a picatinny profile, a weaver profile and an 11 mm profile.

6. The accessory adapter of claim 4, wherein the accessory adapter is configured to be connectable to at least one of a reflex sight and a laser pointer.

7. The accessory adapter of claim 1, wherein:
    the optical imaging device has an outer shell surface; and,
    said circular ring-shaped fastening element is configured to be of an exactly complementary shape to a section of the outer shell surface of the optical imaging device.

8. The accessory adapter of claim 1, wherein:
    the optical device defines an optical axis; and,
    said circular ring-shaped fastening element is configured to be axially rotatable about the optical axis when said circular ring-shaped fastening element is connected to said optical imaging device.

9. The accessory adapter of claim 1, wherein said circular ring-shaped fastening element is configured to be capable of being locked or latched in different predetermined positions.

10. The accessory adapter of claim 1, wherein said circular ring-shaped fastening element is configured to be fixed in different axial positions via manual fixation.

11. The accessory adapter of claim 8, wherein said circular ring-shaped fastening element has an outer shell surface having at least one of a recess and a cutout configured for a simplified rotational handling.

12. The accessory adapter of claim 1, wherein said circular ring-shaped fastening element is configured to be rotatable into a transport position and can be at least one of fixed and latched in said transport position.

13. An optical device comprising:
    at least one of spotting scope, a telescope, a telephoto lens;
    an accessory adapter including a profiled rail, a bar having a first and a second end, a circular ring-shaped fastening element configured to connect said first end of said bar to the optical device, and, said second end of said bar being configured to connect to said profiled rail;
    the optical device defining an optical axis; and,
    said profiled rail defining a longitudinal axis configured to be parallel to said optical axis.

* * * * *